C. E. WILLS.
GAS COOKING STOVE.
APPLICATION FILED SEPT. 6, 1910.
1,108,650.
Patented Aug. 25, 1914.
2 SHEETS—SHEET 1.
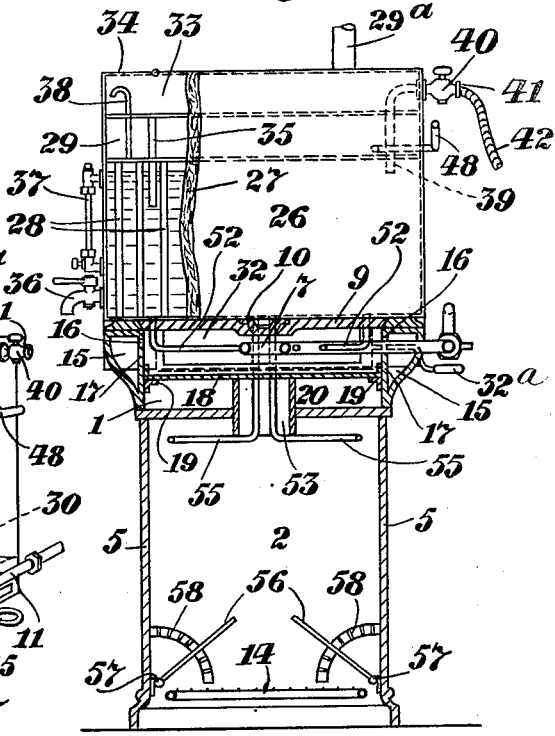
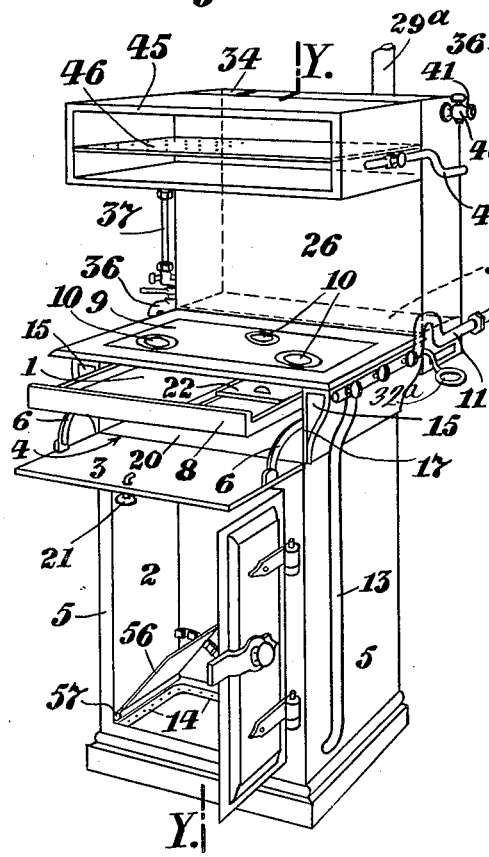
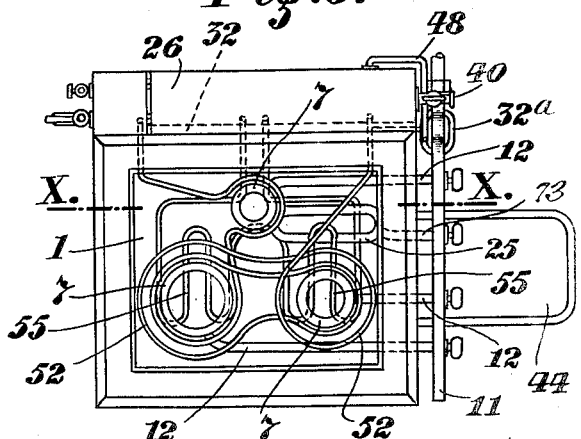
Witnesses:
O. F. Nagle
H. G. Dieterich
Inventor:
Clara Ellen Wills,
By Wiedersheim & Fairbanks
Attorneys

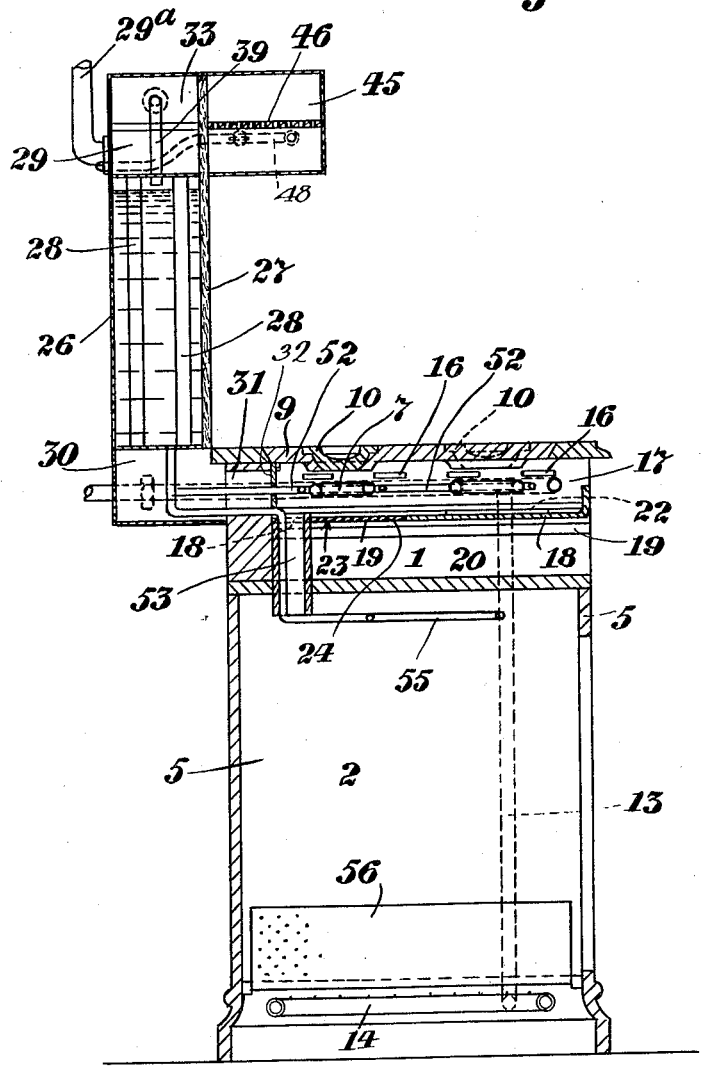

UNITED STATES PATENT OFFICE.

CLARA ELLEN WILLS, OF SOUTHPORT, ENGLAND.

GAS COOKING-STOVE.

1,108,650.  Specification of Letters Patent.  Patented Aug. 25, 1914.

Application filed September 6, 1910. Serial No. 580,630.

*To all whom it may concern:*

Be it known that I, CLARA ELLEN WILLS, a subject of the King of Great Britain, residing at Southport, Lancashire, England, have invented certain new and useful Improvements in Gas Cooking-Stoves, of which the following is a specification.

This invention relates to gas heated cooking stoves, and it has for its object to more fully utilize the heat obtained therein so that the utmost economy in gas consumption is obtained with increased utility of the stove.

The stove is made with a box top or chamber above the oven, and within said chamber one or more gas rings or jets are inclosed, the top plate of the chamber being heated thereby so as to enable cooking to be done thereon while the heat produced by the burning gas jets is also utilized to heat a compartment in said chamber beneath the gas rings, and is also adapted to heat the water contained in a vessel arranged above and adjacent to the stove. Means are also provided for conveying the waste hot gases from the gas jets in the oven to the box top or chamber and to said water vessel for the purpose of heating the same.

The invention also comprises means within the oven, for directing the heat to any part thereof and to any desired part or parts of the viands therein. Additional heating space is also provided in conjunction with the water vessel for the purpose of utilizing the waste hot gases therefrom, and the steam generated in said water vessel may be conducted to any desired cooking utensil. The invention also comprises certain other improvements which will be hereinafter fully set forth.

In order that the invention may be more clearly understood, I have hereunto appended the accompanying sheets of drawings, whereon:—

Figure 1 is a perspective view of my improved gas-heating cooking stove, the oven door and the front of the box top or chamber being shown open and the interior plate or tray being shown partially drawn out while certain details are omitted for the sake of clearness. Fig. 2 is a sectional elevation on the line X, X, Fig. 3, certain parts being omitted or broken away for the sake of clearness. Fig. 3 is a plan of the stove, various parts being removed or omitted in order to show clearly the pipe arrangement. Fig. 4 is a sectional elevation, to an enlarged scale, on the line Y, Y, Fig. 1, the section being composite with regard to the tray 18 in order to show the grid 24 and certain parts being omitted to avoid confusion.

Throughout the drawings the same reference numerals, wherever repeated, indicate the same or similar parts.

The stove shown on the drawings is made with a box top or hollow chamber 1 arranged above the oven 2 and provided with an opening front 3 hinged at its lower edge at 4 to the casing 5 of the stove, being supported, preferably, when open by means of quadrants or the like 6, so that the front 3, when open, as shown in Fig. 1 forms a convenient shelf in front of the stove, at the same time, permitting access to the interior of the chamber 1. The hinged front 3 may be retained in its closed position by any suitable retaining means, such as the turn-button 21. One or more gas rings or jets 7 of usual construction are provided in the chamber 1 beneath openings formed in a top plate 9 which, as will be hereinafter explained, also acts as a hot plate. Suitable covers 10 are provided for closing said openings when the latter are not covered by a cooking utensil. The gas is supplied to the burners 7 in the usual manner by way of a pipe 11 and branches 12, a branch 13 being led to gas burners 14 in the lower part of the oven 2. Air is supplied to the chamber 1 by way of passages 15 at the sides thereof, said passages being open at the front and back of the stove and communicating with the chamber 1 by way of openings 16, (Figs. 2 and 4) in plates 17 between said passages 15 and the chamber 1. Within the chamber 1 is slidably and removably fitted a plate or tray 18 resting on brackets 19 secured to the plates 17, said tray forming the top of a compartment 20, below the gas burners 7, which may be used for heating cooking utensils or for keeping viands and dishes warm. The tray 18 also serves to prevent dust, dirt or fumes from the gas burners 7 from fouling the compartment 20. The tray 18 is made with a slidable or otherwise removable part 22 adapted to open or close an opening or cut-away part 23 provided with a grid 24, so that, when the tray 18 has been pushed in, the grid 24 comes beneath a griller 25 (Fig. 3) connected with the pipe 11 by a branch pipe 73 and, on uncovering the grid 24 by means of the removable part 22, meats may be grilled thereon.

At the rear of the stove, and, preferably, supported thereon, is a water-heating vessel 26, preferably, made with an outer enameled iron casing lined with silicate cotton or other non-conducting material 27 (see Figs. 2 and 4) and having therein a number of vertical heating tubes 28 communicating at the top with a compartment 29 and at the bottom with a compartment 30 (see particularly Fig. 4) hereinafter referred to as a waste hot gas chamber. This waste hot gas chamber 30 communicates by way of a flue 31 with the chamber 1, the passage of the hot gases from the chamber 1 being controlled by means of a sliding damper 32 having a handle 32ª by means of which it may be adjusted, said damper also enabling the flue 31 to be closed and thereby preventing cold air from passing therethrough when the chamber 1 is not heated. The hot gases, after entering the waste hot gas chamber 30, ascend the tubes 28 and pass into the upper compartment 29 and from thence may be led to a suitable chimney by pipe 29ª or as will be hereinafter fully described, to additional heating space, in which viands or utensils may be kept warm. Above the compartment 29 is, preferably, arranged a reserve hot water chamber 33 having a lid 34 for filling and an outlet pipe 35 leading into the upper part of the water vessel 26. The vessel 26 is provided with the usual draw-off cock 36 and water gage 37, and with a vent pipe 38 leading into the upper part of the reserve water chamber 33 and enabling air to escape when the tank 26 is being filled, a steam pipe 39 being also led from the upper part of the water vessel 26 to the exterior and provided with a suitable regulating cock 40 and connection 41 to which may be connected a flexible pipe 42 for conducting the steam to any suitably placed steam cooking utensil. The cooking utensil may be supported on a shelf 44 (see Fig. 3) secured to the side of the oven.

As shown at Figs. 1 and 4, I preferably arrange an additional heating chamber 45 in front of the water vessel 26 and suitably secure same to the said vessel. The heating chamber 45 is provided with a perforated shelf 46 and communicating with the space between the said shelf and the bottom of the chamber 45 is a pipe connection 48 for supplying hot gases from the upper compartment 29, hereinbefore referred to, said gases entering the space between the shelf 46 and the bottom of the chamber 45 by way of an inlet at one end of the said chamber and rising through the perforations in the shelf 46 and passing out at the front of the heating chamber 45.

One or more coils of piping 52 may be passed around the gas rings 7 in the chamber 1, as shown clearly at Fig. 3, said piping being connected to the water vessel 26 so that water will circulate through said piping and, owing to the proximity of the coils to the gas burners, the water will be heated thereby.

A flue 53, see Figs. 2 and 4, communicates with the oven 2 and with the chamber 1 so that, when the oven burners 14 are lighted, the hot gases therefrom pass up the flue 53 and are utilized for heating the hot plate 9, the hot gases passing away from the chamber 1 in the manner already described. The hot gases in the oven 2 are also utilized to heat a coil of piping 55 in the upper part thereof, said piping 55 being also connected to and communicating with the water vessel 26 so that water will circulate through the piping and be heated therein. Similarly, when the oven burners 14 are not lighted, the oven will be, more or less, heated by the hot water from the vessel 26 circulating in the piping 55.

One of the chief advantages of this stove is the small consumption of gas, the burners being inclosed and the heating power of the gas used to the fullest extent. In the ordinary gas stove with the open burners, when a pan or kettle, etc., is placed over the burner, a large percentage of the heat, together with the fumes, rise around the edges of the utensil and pass into the room. With the improved stove, as made under my invention the gases, usually wasted, travel over the coils of the water-circulating pipe or pipes connected with the hot water vessel, heating and causing the water therein to circulate and thus assisting in the heating of the water in the vessel. The hot gases after passing over the coils of piping travel under the top plate of the stove making it into an effective hot plate capable of being used for cooking. The gases then pass through the flue 31 and rise through the vertical tubes 28 in the water vessel, heating the water therein, the hot gases passing into the compartment 29 and under the reserve water chamber or tank slightly heating the water therein. The hot gases thereafter pass by way of the pipe connection 48 to the additional heating chamber heating the shelf therein and passing from thence into the atmosphere or being conducted to a chimney or other suitable outlet.

The hot gases from the burners in the oven are first utilized for heating or cooking meats therein, as will be hereinafter more particularly set forth, thereafter heating the pipe coil 55 and then they are led up the flue 53 into the chamber 1 where they are further utilized for heating the hot plate 9 and passing from the chamber 1, enter the flue 31 and waste hot gas chamber 30 and passing therefrom, through the tubes 28, they heat the water in the vessel 26 and then pass through the chamber 29 below the reserve water tank 33 and finally pass away as hereinbefore described.

The interior of the oven 2 is provided with two reflectors or vanes 56 arranged opposite one another and just above and in proximity to the gas jets 14, the deflectors 56 being hinged or otherwise jointed to the casing at 57 inside the oven 2 so as to be capable of moving through the arc of a circle, each deflector 56 being adjustably supported in an inclined position by means of a notched or toothed quadrant 58 arranged at one end thereof. The deflectors are, preferably, perforated so as to enable part of the hot gases from the gas jets 14 to pass through the deflectors and to be distributed above the same.

The arrangement is such that, if, for instance, a joint of meat is to be roasted, the deflectors can be manipulated so as to direct the hot gases from the gas jets to precisely such part or parts of the joint as may be desired. My invention also enables practically all the hot gases to be effectively utilized for cooking the meat, and, consequently, less gas is required than at present and waste is avoided.

Having now fully described my invention what I claim and desire to secure by Letters Patent is:—

1. In combination, a gas stove having an oven, a hollow chamber communicating therewith, said chamber being open at the front, means for closing the front of the chamber, a lateral passageway at each side of the chamber for the admission of air when the front thereof is closed, each passageway communicating by a series of openings with the interior of the chamber, gas burners located in said chamber, a water vessel, a waste hot gas chamber at the bottom thereof, a flue connecting said waste hot gas chamber with said hollow chamber, and a series of tubes communicating with said waste hot gas chamber and extending through said water vessel, said tubes being adapted to convey the waste hot gases from the waste hot gas chamber through the water and thereby heat the same.

2. In combination, a gas stove having a hollow chamber at the top thereof, gas burners located in said chamber, a water vessel on the stove and which is divided into a lower compartment, an intermediate compartment and an upper compartment, the lower compartment communicating with said chamber, the intermediate compartment being supplied with water and having a series of tubes therein establishing communication between the lower compartment and the upper compartment, the upper compartment having a water supply pipe extending into the intermediate compartment and a vent pipe extending from the intermediate compartment to the upper compartment.

3. In combination, a gas stove having a hollow chamber at the top thereof, gas burners located in said chamber, a water vessel connected with the stove and which is divided into a lower compartment, an intermediate compartment and an upper compartment, the lower compartment communicating with said chamber, the intermediate compartment being supplied with water and having a series of tubes therein establishing communication between the lower compartment and the upper compartment, the upper compartment having a partition therein dividing it into two chambers, the upper one an air chamber which can be filled with water through means provided at the top thereof and the lower chamber being for the waste hot gases.

4. A gas cooking stove having an oven, a rectangular hollow chamber thereover, said hollow chamber being open at the front, removable cover plates for the hollow chamber, a sliding tray dividing the hollow chamber into two compartments, gas jets located in one of the compartments of the hollow chamber, means for closing the front of the hollow chamber, a lateral passage way at each side of the hollow chamber for the admission of air when the front thereof is closed, each passage way communicating by a series of openings with the interior of the hollow chamber, a water vessel arranged in connection with the stove and flues through which the waste hot gases from the gas jets in the hollow chamber may pass through the water vessel.

5. A gas stove comprising, in combination, a hollow chamber, gas burners located in said chamber, a water vessel connected with the stove and which is divided into a lower compartment, an intermediate compartment and an upper compartment, the lower compartment communicating with said chamber, the intermediate compartment being adapted to be supplied with water and having a series of tubes therein establishing communication between the lower compartment and the upper compartment, the upper compartment having a partition therein dividing it into two chambers, the upper one an air chamber which can be filled with water through means provided therefor and the lower chamber being for the waste hot gases, and piping located round about the gas burners and communicating with the water vessel and adapted to be supplied with water therefrom.

6. A gas stove comprising, in combination, an oven, a hollow chamber at the top thereof, gas burners located in said oven and hollow chamber, a water vessel connected with the stove and which is divided into a lower compartment, and intermediate compartment and an upper compartment, the lower compartment communicating with said chamber, the intermediate compartment being adapted to be supplied with water and having a series of tubes therein establishing communication between the lower compartment and the upper compartment, the upper compartment having a partition therein dividing it into two chambers, the upper one an air chamber which can be filled with water through means provided therefor and the lower chamber being for the waste hot gases, and piping located round about the gas burners in the oven and hollow chamber and communicating with the water vessel and adapted to be supplied with water therefrom.

7. A gas cooking stove having an oven and also a hollow chamber at the top thereof which is open at the front, a sliding tray dividing said hollow chamber into two compartments, gas jets located in the upper compartment of said hollow chamber, a door for closing the front of the hollow chamber, a lateral passageway at each side of the hollow chamber for the admission of air when the front thereof is closed, each passageway communicating by a series of openings with the interior of the hollow chamber, a water vessel arranged in connection with the stove and means for conducting the waste hot gases from the gas jets in the hollow chamber through the water vessel so as to heat the water therein.

8. A gas cooking stove having an oven, a hollow chamber above the oven, said hollow chamber being open at the front, a hinged door for closing the front of the hollow chamber, gas jets located in said hollow chamber and in the oven, a lateral passageway at each side of the hollow chamber for the admission of air when the front thereof is closed, each passageway communicating by a series of openings with the interior of the hollow chamber, a water vessel arranged in connection with the stove and means whereby the waste hot gases from the gas jets in the hollow chamber and in the oven are utilized to heat the water in the water vessel.

9. In combination, a gas stove having an oven, gas burners located in said oven, a hollow chamber above the oven, means connecting the oven and hollow chamber, gas burners located in said chamber, a water vessel, a waste hot gas chamber at the bottom thereof, means connecting said waste hot gas chamber with said hollow chamber, a compartment at the top of said water vessel, a series of tubes in said water vessel connecting the waste hot gas chamber and the compartment at the top of the water vessel, a heating chamber and means connecting same with the compartment at the top of the water vessel.

10. In combination, a gas stove having an oven, gas burners in said oven, a hollow chamber above the oven, gas burners in said hollow chamber, means connecting the oven and hollow chamber, a vertical water vessel, a waste hot gas chamber at the bottom thereof, means connecting said waste hot gas chamber with said hollow chamber, a compartment at the top of said water vessel, means in the water vessel connecting the waste hot gas chamber and the compartment at the top thereof, a heating chamber, a perforated partition dividing said heating chamber into two compartments, the front of the upper compartment being open and means connecting the lower compartment with the compartment at the top of the water vessel.

In testimony whereof I affix my signature in presence of two witnesses.

CLARA ELLEN WILLS.

Witnesses:
J. McCormick,
H. Williams.